May 5, 1964  P. W. G. JOHNSTON ETAL  3,131,652
APPARATUS FOR CUTTING CONFECTIONERY
Filed July 21, 1961  6 Sheets-Sheet 1

INVENTORS
Peter W. G. Johnston
Ronald G. Hewitt
Watson, Cole, Grindle & Watson
ATTORNEYS

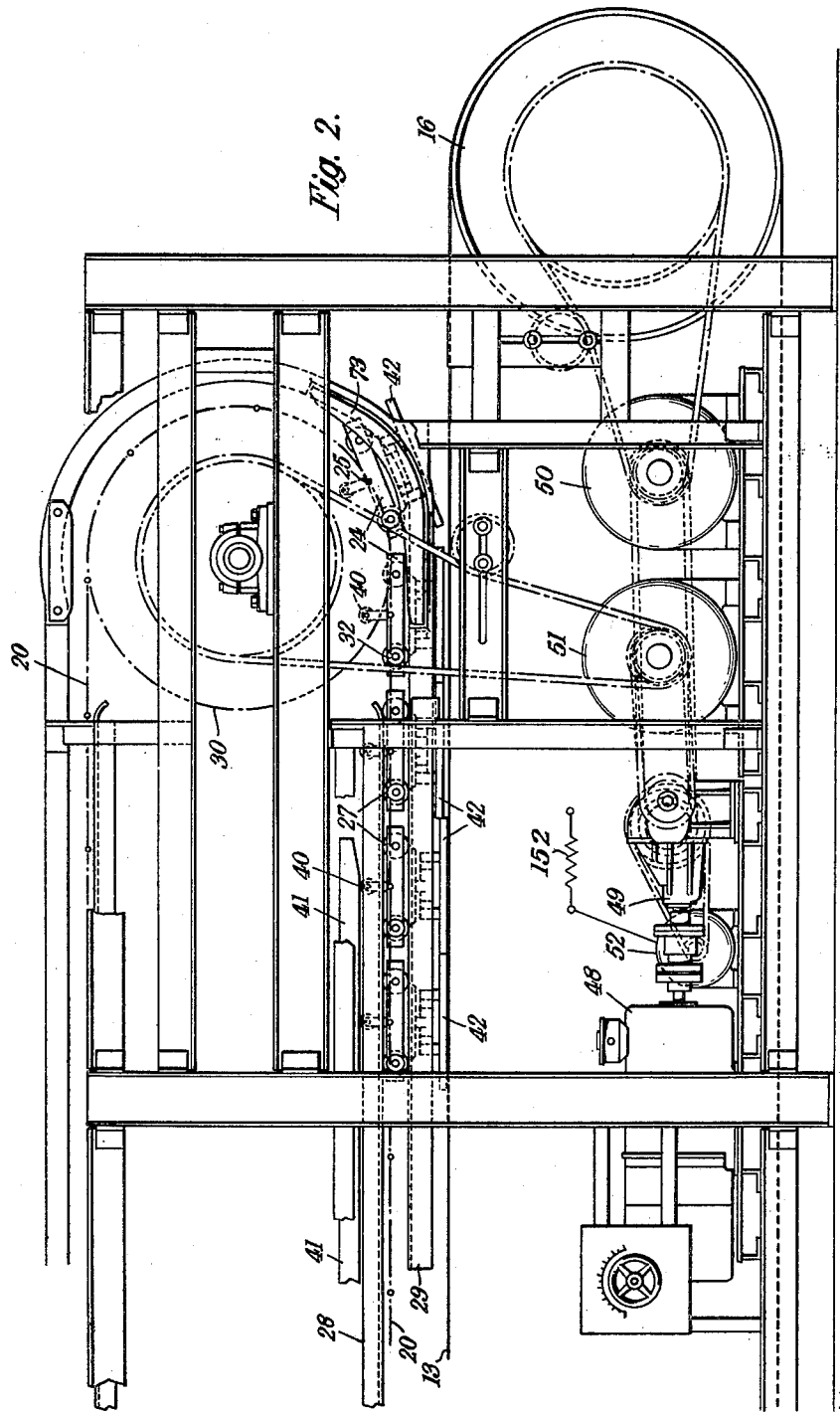

May 5, 1964     P. W. G. JOHNSTON ETAL     3,131,652
APPARATUS FOR CUTTING CONFECTIONERY
Filed July 21, 1961                            6 Sheets-Sheet 6
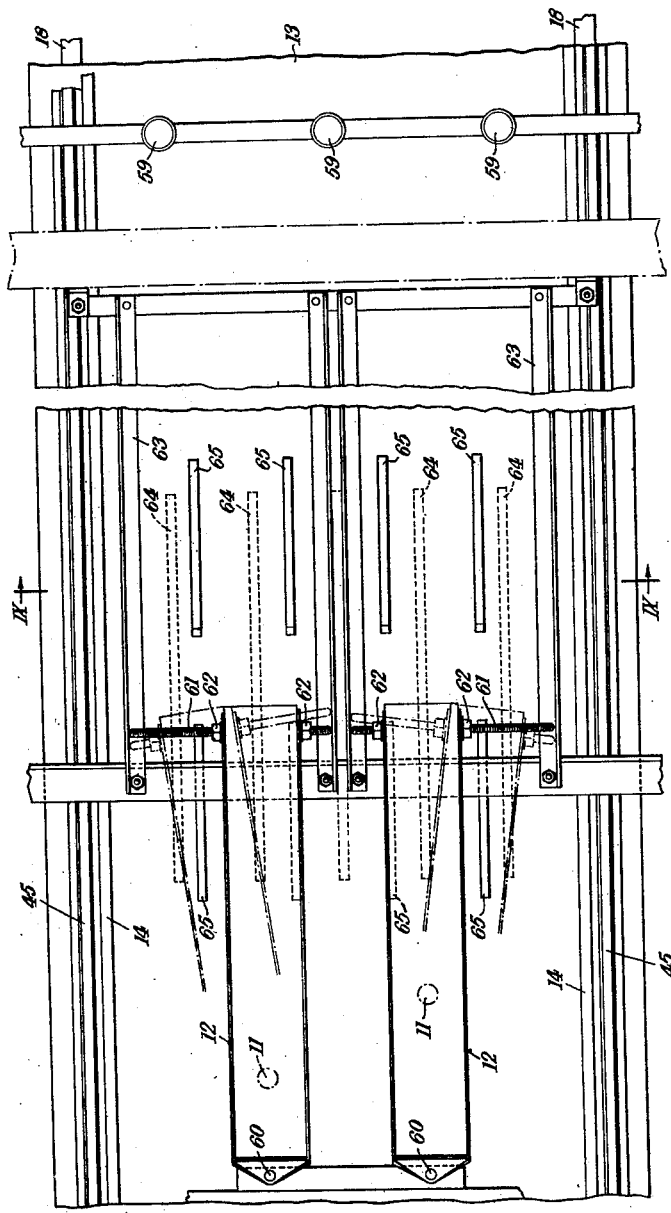
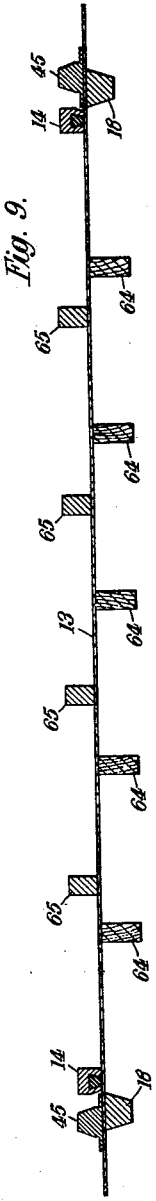
INVENTORS
Peter W. G. Johnston
Ronald H. Hewitt
Watson, Cole, Grindle & Watson
ATTORNEYS

United States Patent Office 3,131,652
Patented May 5, 1964

3,131,652
APPARATUS FOR CUTTING CONFECTIONERY
Peter William Gilbey Johnston, Leamington Spa, and Ronald George Hewitt, Peterborough, England, assignors to Baker Perkins Holdings Limited, Peterborough, England, a British company
Filed July 21, 1961, Ser. No. 125,876
Claims priority, application Great Britain July 26, 1960
7 Claims. (Cl. 107—4)

The existing practice in the manufacture of confectionery, such for example as boiled sugar, toffee and butterscotch is to pour the cooked confectionery on to a table and cut it with a manually operated frame cutter consisting of two sets of spaced parallel cutting blades, the blades of one set extending at right angles to those of the other set. The blades do not normally cut compltely through the mass of confectionery but leave thin webs of material connecting the cut pieces, these thin webs being broken by subjecting the material taken from the table to vibration or by breaking these webs by shock or knives when the sugar has cooled and is therefore in a more brittle condition. The present invention provides an apparatus for the continuous frame cutting of continuously produced confectionery.

The apparatus according to the invention comprises a cooling conveyor band adapted to receive on its upper run a layer of continuously produced confectionery, a cutter conveyor arranged to travel at the same speed as the band and disposed above the band with its lower run parallel to the upper run of the band, a series of cutter frames mounted in close juxtaposition on the cutter conveyor and mechanism for depressing the cutter frames on the lower run of the cutter conveyor into engagement with the confectionery on the band and thereafter lifting the cutter frames from the confectionery prior to the discharge of the latter from the band.

One embodiment of the invention as applied to the continuous cutting of butterscotch will now be described in detail, by way of example, with reference to the accompanying drawings. It will be appreciated however, that the apparatus described below can also be used for cutting other forms of confectionery, e.g. toffee or high boiled sugar.

Figure 1:
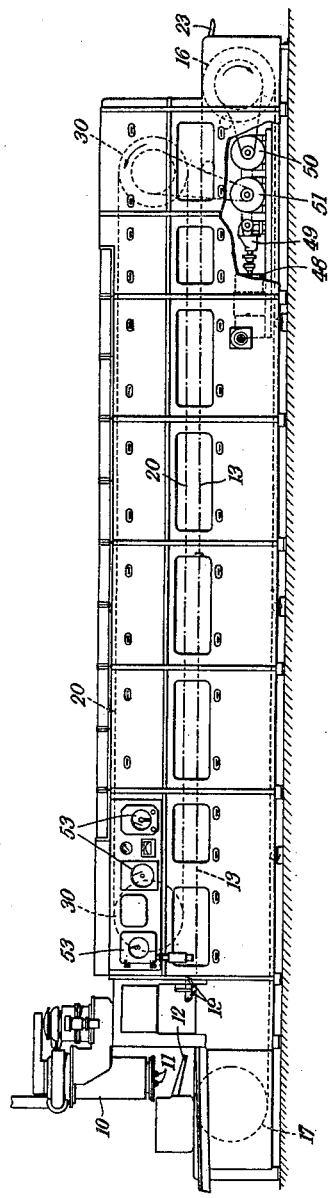
Figure 7:
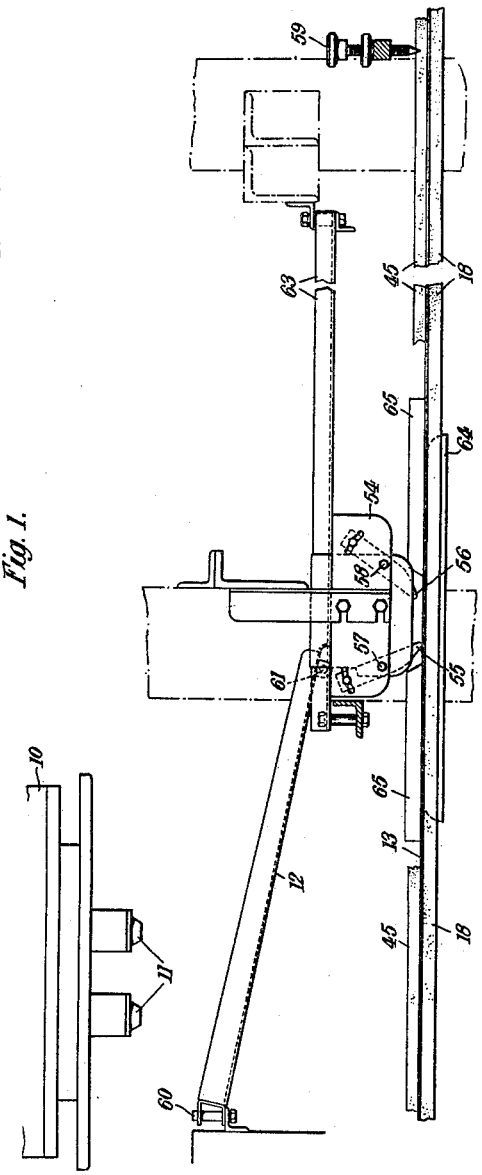
Figure 3:
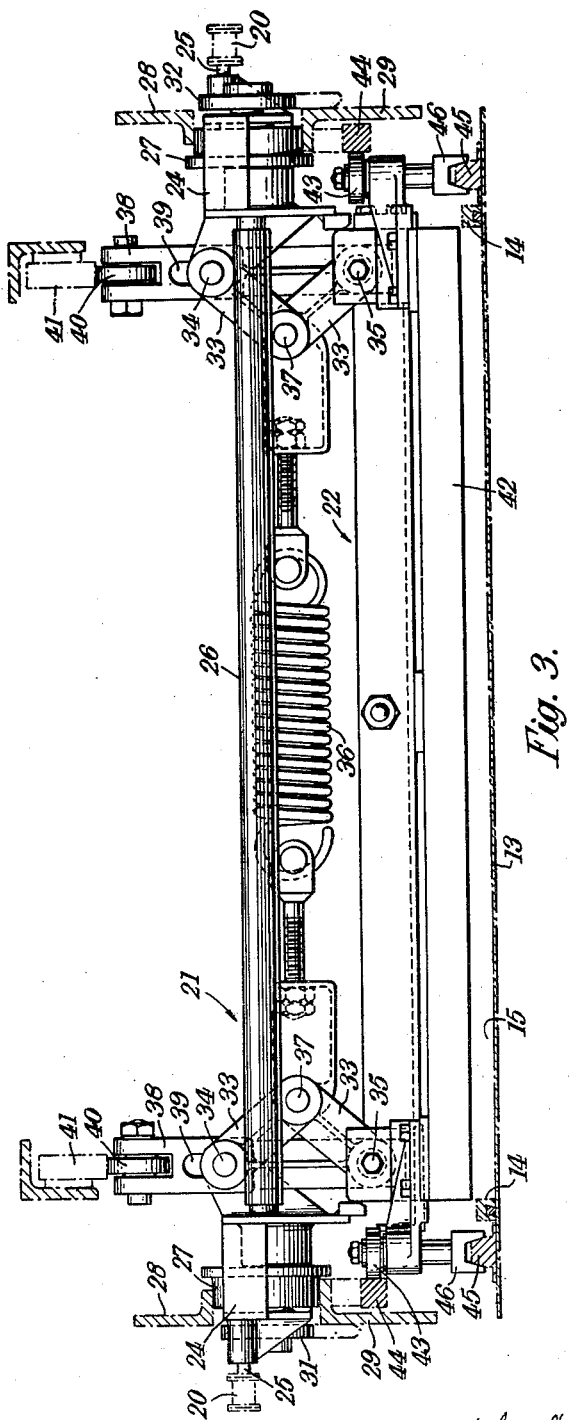
Figure 4:
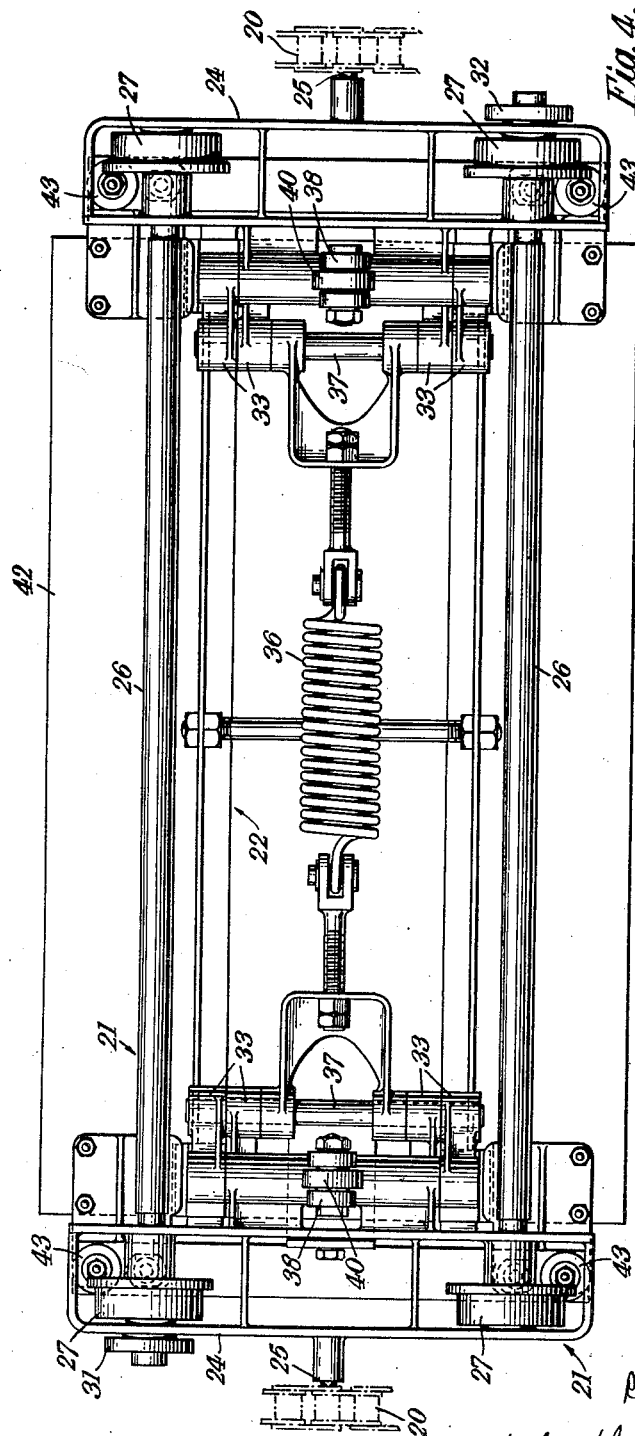
Figure 5:
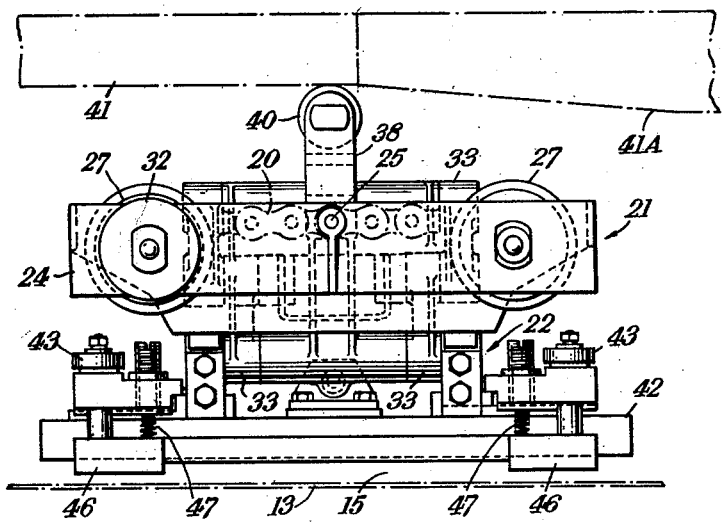
Figure 6:
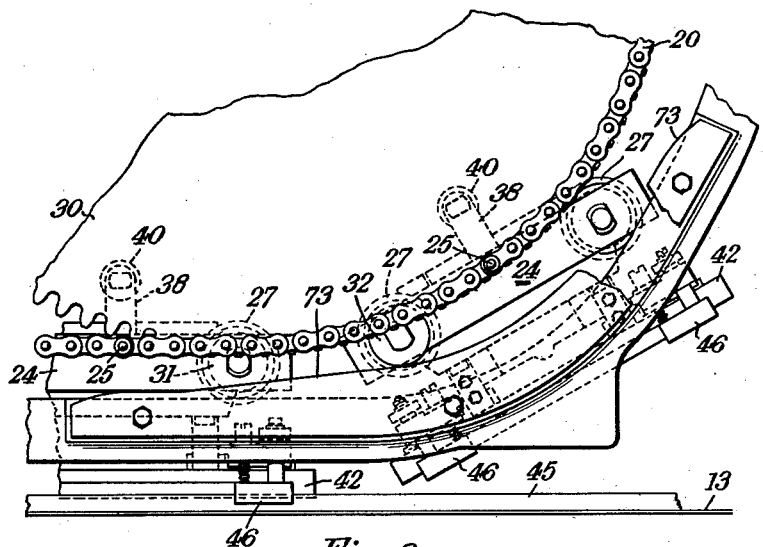

In the drawings:
FIG. 1 is a side elevation of the machine,
FIG. 2 is a side elevation on a larger scale of the delivery end of the machine,
FIG. 3 is an enlarged cross sectional view, showing one of the cutters and its carrier in end elevation,
FIG. 4 is a corresponding plan view,
FIG. 5 is a side elevation looking from the right hand side in FIG. 3,
FIG. 6 is an enlarged detail view showing mechanism for controlling the attitude of the cutter carriers at the delivery end of the machine,
FIG. 7 is an elevation showing a modified mechanism for discharging butterscotch on to the cooling conveyor,
FIG. 8 is a corresponding plan view with the hopper removed, and
FIG. 9 is a section on a larger scale on the line IX—IX in FIG. 8.

Like reference numerals indicate like parts throughout in figures.

The butterscotch is cooked continuously in a "microfilm" cooker 10 (FIG. 1) of the kind described in British patent specification No. 405,276, metered quantities of melted butter and syrup being pumped continuously to a mixing and emulsifying device of known type (not shown) and thence to the cooker. In such a cooker the butterscotch travels downwardly through the cooker in a thin film, being spread as a thin film on the cooking surface by rotating spreader blades. Alternatively, batches of butter may be mixed with batches of syrup preparatory to pumping to the cooker. The butterscotch is discharged from the cooker through nozzles 11 on to a feed chute 12 from which it flows on to a water-cooled stainless steel conveyor band 13. The cooling jacket for cooling the band 13, being conventional, is not shown. The band 13 carries a pair of longitudinally extending rubber strips 14 (FIG. 3) defining on the band a shallow trough 15 to receive the butterscotch. The band is driven by a drum 16 over which it passes at its delivery end, a corresponding idler drum 17 at the other end of the band being provided with a device (not shown) for oiling it with edible oil.

The driving and idler drums 16, 17 are conveniently constituted by opposed pulleys keyed to shafts carrying them and having peripheral grooves engaged by V-belts 18 (FIGS. 7 and 9) attached to the undersurface of the band 13, the pulleys at one side of the machine being fixed to their respective shafts and the pulleys at the other side of the machine being splined to their respective shafts to provide side-play. This construction ensures accurate tracking of the band 13.

The butterscotch on the band 13 first passes beneath adjustable scraper blades 19 (FIG. 1) for making even the thickness of the layer of butterscotch on the band and then into the pass between the upper run of the band 13 and the lower run of a pair of parallel docker chains 20 (see also FIGS. 3 and 4) which carry carrier frames 21, supporting closely abutting cutter frames 22 carrying cutter blades 42. These cutter frames 22 are depressed by a pair of cams, as later described, at a position just inside the entry to the pass so causing their blades to penetrate through the major portion (e.g. ⅞) of the depth of the layer of butterscotch on the band 13 and are raised clear of said layer just before the end of the pass. The butterscotch leaves the band down a chute 23 in the form of cut blocks united by thin webs. It may be passed to an enrober for application of a cholocate or like coating to the butterscotch, or it may be fed direct to a vibrator for breaking it into individual blocks. During their travel on the top run of the docker chains the cutter blades may be lubricated with edible oil.

Each carrier frame 21 consists of a pair of end members 24 (FIG. 4), each of which is pivoted to the adjacent docker chain 20 at a point 25 midway in its length and a pair of transversely extending rods 26 joining the end members 24. Each end member 24 carries a pair of spaced rollers 27 which run between upper and lower guide rails 28, 29 (FIG. 3). The tracks formed between the rails 28, 29 extend around the sprockets 30 (FIG. 1) at the ends of the docker chain 20, as shown most clearly in FIG. 2. The cutter blades accordingly face downwardly when the frames 21 are on the lower run of the docker conveyor and upwardly when the frames 21 are on the upper run. One end member 24 of each carrier frame has an additional roller 31 at its leading end and the other end member 24 has an additional roller 32 at its trailing end. As the carrier frames 21 pass round the sprockets 30, these additional rollers coact with fixed guide cams. A guide cam 73 (shown in FIGS. 2 and 6) which co-operates with the rollers 32 is provided at the front of the machine at the delivery end and an identical guide cam (not shown) which co-operates with the rollers 31 is provided at the rear of the machine at the feed end. The track engaged by the rollers 27 is so shaped that the guide cams are able, by coaction with the rollers 31 and 32, to tilt the cutter frames 22 in such fashion that the leading edge of the cutter frame 22 at the feed end does not contact or dig into the butterscotch on the band 13 nor does the trailing edge of the cutter frame 22 at the delivery end.

Each cutter frame 22 is connected to its carrier frame 21 at each side of a pair of toggle links 33 (FIG. 3). The upper link of each pair is pivoted at its upper end 34 to the carrier frame 21 and the lower link of each pair is pivoted at its lower end 35 to the frame cutter 22. A tension spring 36 extends between the junctions 37 of the two links of each pair and normally holds the frame cutters 22 in a position (shown in FIG. 3) such that, when on the lower run of the docker conveyor, they are raised clear of the butterscotch on the band 13.

Each cutter frame has at each end an upstanding projection 38, formed with a slot 39 embracing the upper pivot pin 34 of the toggle linkage and carrying a roller 40 at its upper end which engages a cam rail 41. Shortly after the cutter frames 22 have entered the pass, these rollers 40 engage lower portions 41A (FIG. 5) of the cam rails, and are accordingly depressed, so straightening the toggle linkages 33 and forcing the cutter frames 22 downwards so that the cutter blades 42 penetrate into the butterscotch. The rollers run off the lower portions 41A of the cam rails shortly before the end of the pass, so enabling the spring 36 to raise the frame cutter to withdraw the cutter blades from the butterscotch.

The frame cutters 22 carry, at each end, rollers 43 (FIG. 3) mounted on vertical axes and arranged to engage short guide rails 44 to centre the frame cutters in relation to the shallow trough 15 formed by the rubber strips 14 as already described, as they enter the pass between the two conveyors.

These strips 14, which are required to withstand a temperature of the order of 300° F., are constituted by rubber V-belts riveted to the steel band and each covered by a sheath of extruded silicone rubber which forms a dovetail joint with the V-belt and contacts the steel belt 13 at its lower end on both sides of the V-belt. The butterscotch in the trough 15 is accordingly in contact with silicon rubber only.

It is essential that the frame cutters 22 and the band 13 should travel at the same linear speed and to ensure this the band 13 is provided outside the rubber strips 14 with projections constituted by a pair of rubber V-belts 45 bonded to the metal of the band. The cutter frames carry depending grippers 46, loaded by springs 47 (FIG. 5) which engage these V-belts 45 to clutch the cutter frames 22 to the band 13.

The band 13 and the docker conveyor chains 20 are driven from a common electric motor 48 (FIG. 2) through a differential gear box 49 from which the drive is taken via separate reduction boxes 50, 51, to the drum 16 at the delivery end of the band 13 and to the sprockets 30 driving the docker chains 20. The band 13 requires less pull to drive it than the docker chains 20. The clutching of the frame cutters 22 to the band 13 and the engagement of the cutter blades 42 in the butterscotch ensure synchronous travel of the frame cutters 22 and the band 13, but as a safety precaution against the load on the docker chains 20 exceeding that on the band 13 to an extent such as to break down the adhesion between the V-belts 45 and the band 13, a D.C. generator 52 is coupled to the output side of the differential gear box 49, the generated current being dissipated in a suitable resistor 152.

It is difficult to match exactly the linear speeds of the band 13 and the docker chains 20 due to the fact that the portions of the chains surrounding the sprockets 30 extend in polygonal formation and not in circular arcs and the impossibility of knowing the precise location of the neutral axis of the steel band 13 as it bends round the axis of the driving drum 16. The differential gear box 49 is accordingly provided to allow exact linear speed equality between the two devices driven by it, by accommodating within itself slight discrepancies in rotational speeds.

The machine includes pneumatically operated dials 53 of known construction for indicating the rates of supply of butter and syrup to the cooker 10 and the cooker temperature.

The modified construction shown in FIGS. 7 to 9 differs only from that just described insofar as concerns the delivery of the butterscotch to the band. Two feed chutes 12 are provided for receiving the butterscotch from the nozzles 11, which are staggered as shown, and the chutes 12 discharge into a hopper 54 (FIG. 7) having adjustable end walls 55, 56, which can be rotated about pivots 57, 58 respectively. The end walls 55, 56 are constituted by heated blades and the thickness of the layer of butterscotch deposited on the band 13 is determined by the position of adjustment of the blade 56. Adjustable depth screws 59 are provided which are screwed into a bar extending above the band 13 and set at the desired level in relation to the band 13 and the blade 56 is then adjusted until the thickness of the layer of butterscotch corresponds to the setting of the screws 59.

The chutes 12 are pivoted on horizontal pivots 60 and each carries at its discharge end a screw threaded rod 61, carrying adjusting nuts 62. The ends of the rods 61, abut against horizontal guides 63 in all positions of adjustment of the chutes 12. The chutes are adjusted as required to maintain an even layer of butterscotch on the band 13. Skids 64 are provided below the band 13 and skids 65 above it for supporting the band in the neighborhood of the hopper 54.

What we claim as our invention and desire to secure by Letters Patent is:

1. Apparatus for cutting butterscotch and like confectionery, comprising a cooling conveyor band having an upper and a lower run, members extending lengthwise and uninterruptedly of said conveyor band and defining therewith a shallow trough for the reception of said confectionery, means for imparting continuous movement to said band, means for continuously discharging a stream of cooked fluid confectionery on to the upper run of said band and into said trough, a cutter conveyor mounted above said band, means for driving the cutter conveyor continuously at the same speed as the band, a series of cutter frames mounted in close juxtaposition on the cutter conveyor, cutters mounted on each cutter frame and mechanism for depressing said cutter frames in sequence by a distance sufficient to cause the cutter to penetrate through the major part only of the layer of confectionery in said trough and thereafter lifting said cutter frames from the confectionery, said cutters cutting the confectionery into cut blocks united by thin webs.

2. Apparatus for cutting butterscotch and like confectionery, comprising a cooling conveyor band having an upper and a lower run, members extending lengthwise of said conveyor band and defining therewith a shallow trough for the reception of said confectionery, a cutter conveyor mounted above said band, means for imparting continuous movement to the cutter conveyor and to the band, a series of cutter frames mounted in close juxtaposition on the cutter conveyor, means connecting said cutter conveyor and said band and constraining them to move in unison, grippers on said cutter frames arranged to engage frictionally projections on the band to synchronize the movements of the cutter frames and the band and means for depressing said cutter frames in succession to cut the confectionery in said trough and thereafter raising them again.

3. Apparatus for cutting butterscotch and like confectionery, comprising a cooling conveyor band having an upper and a lower run, members extending lengthwise of said conveyor band and defining therewith a shallow trough for the reception of said confectionery, a cutter conveyor mounted above said band, means connecting said cutter conveyor and said band and constraining them to move in unison, a motor, a differential gear coupled to said motor, driving means connecting said differential gear to said band and said cutter conveyor, a direct current generator coupled to the output side of said differential gear and arranged to dissipate its generated current in a resistor connected to said generator, a series of cutter frames mounted in close juxtaposition on the cutter conveyor, cutters mounted on each cutter frame and means for depressing said cutter frames in succession to cut the confectionery in said trough and thereafter raising them again.

4. Apparatus as claimed in claim 2, which includes means for continuously discharging fluid confectionery on to the upper run of said band including a hopper disposed above the band and having an adjustable wall for determining the thickness of the layer of confectionery deposited in the trough.

5. Apparatus as claimed in claim 4, which includes skids above and below the band and arranged to support the band in the neighborhood of the hopper.

6. The combination with cutting apparatus as claimed in claim 4 of a continuous cooker and a feed chute for delivering confectionery from the cooker to the hopper, said feed chute being adjustable laterally in relation to the band.

7. Apparatus for cutting butterscotch and like confectionery, comprising a cooling conveyor band having an upper and a lower run, members extending lengthwise of said conveyor band and defining therewith a shallow trough for the reception of said confectionery, means for imparting continuous movement to said band, means for continuously discharging a stream of cooked confectionery on to the upper run of said band and into said trough, a cutter conveyor mounted above said band, means for driving the cutter conveyor continuously at the same speed as the band, a series of cutter frames mounted in close juxtaposition on the cutter conveyor, cutters mounted on each cutter frame, mechanism for depressing said cutter frames in sequence by a distance sufficient to cause them to penetrate through the major part only of the layer of confectionery in said trough and thereafter lifting said cutter frames from the confectionery, said cutter frames cutting the confectionery into cut blocks united by thin webs, and means for tilting said cutter frames in relation to the cutter conveyor as they approach and leave the band to prevent the ends of said cutter frames from digging into the layer of confectionery on the band.

References Cited in the file of this patent
UNITED STATES PATENTS

| | | |
|---|---|---|
| 1,015,790 | Dern | Jan. 30, 1912 |
| 1,366,226 | Welsh | Jan. 18, 1921 |
| 1,530,318 | Oszman | Mar. 17, 1925 |
| 1,703,962 | Scholl | Mar. 5, 1929 |
| 1,839,050 | Ponisch | Dec. 29, 1931 |
| 2,023,291 | Roth | Dec. 3, 1935 |
| 3,009,427 | Bell | Nov. 21, 1961 |
| 3,064,590 | Thiele | Nov. 20, 1962 |